(12) United States Patent
Kerbiriou et al.

(10) Patent No.: US 11,501,231 B2
(45) Date of Patent: Nov. 15, 2022

(54) METHOD FOR PROCESS ANALYSIS

(71) Applicant: UNIVERSITÉ DE LORRAINE, Nancy (FR)

(72) Inventors: Corentin Kerbiriou, Nancy (FR); Henri Reydon, Brantigny (FR); Jeffrey Honion, Vandoeuvre-lès-Nancy (FR); Laurie Pacini, Neuves Maisons (FR)

(73) Assignee: UNIVERSITÉ DE LORRAINE, Nancy (FR)

( * ) Notice: Subject to any disclaimer, the term of this patent is extended or adjusted under 35 U.S.C. 154(b) by 175 days.

(21) Appl. No.: 16/655,700

(22) Filed: Oct. 17, 2019

(65) Prior Publication Data

US 2021/0117883 A1 Apr. 22, 2021

(51) Int. Cl.
| | |
|---|---|
| *G06Q 10/06* | (2012.01) |
| *G06F 3/0482* | (2013.01) |
| *G06F 3/0481* | (2022.01) |
| *G09B 19/00* | (2006.01) |
| *G06F 3/04817* | (2022.01) |

(52) U.S. Cl.
CPC ....... *G06Q 10/0633* (2013.01); *G06F 3/0482* (2013.01); *G06F 3/04817* (2013.01); *G09B 19/003* (2013.01)

(58) Field of Classification Search
CPC .............. G06F 3/0482; G06F 3/04817; G06Q 10/0633; G09B 19/003
See application file for complete search history.

(56) References Cited

U.S. PATENT DOCUMENTS

| | | | | |
|---|---|---|---|---|
| 9,836,654 | B1* | 12/2017 | Alvi | H04L 67/12 |
| 10,431,339 | B1* | 10/2019 | Cornelius | G16H 10/60 |
| 2004/0067819 | A1* | 4/2004 | Takizawa | G16H 20/30 |
| | | | | 482/8 |
| 2004/0122703 | A1* | 6/2004 | Walker | G16H 50/70 |
| | | | | 706/45 |
| 2010/0030732 | A1* | 2/2010 | Gschwind | G06Q 10/06 |
| 2011/0148879 | A1 | 6/2011 | Moreno | |
| 2011/0229862 | A1* | 9/2011 | Parikh | G09B 5/067 |
| | | | | 434/156 |
| 2013/0054264 | A1* | 2/2013 | Baronov | G16H 40/63 |
| | | | | 705/2 |
| 2013/0054299 | A1* | 2/2013 | Deshpande | G06Q 10/06 |
| | | | | 705/7.26 |
| 2013/0232174 | A1* | 9/2013 | Krajec | G06F 16/9024 |
| | | | | 707/798 |
| 2015/0156076 | A1* | 6/2015 | Matejka | G06F 16/743 |
| | | | | 703/13 |
| 2016/0266728 | A1* | 9/2016 | Sankhavaram | G06F 9/46 |
| 2018/0276040 | A1* | 9/2018 | Hosmani | G06F 9/50 |

OTHER PUBLICATIONS

European Search Report and the Written Opinion dated Mar. 13, 2020, in connection with corresponding EP Application No. 19 30 6352 (8 pgs.).

\* cited by examiner

*Primary Examiner* — Sang H Kim
(74) *Attorney, Agent, or Firm* — Maier & Maier, PLLC

(57) ABSTRACT

A method for process analysis, where the process includes at least one succession of steps associated to objectives to be achieved to obtain the target objective. The steps include receiving a process map, receiving a progression value of each node of the process map and the state of each node of the process map, updating the process map for each node.

19 Claims, 6 Drawing Sheets

METHOD FOR PROCESS ANALYSIS

FIELD

The present invention relates to the field of data analysis and visualization. In particular, the present invention relates to the field of analysis of status of progress of a process and its representation in order to assist the user in the task of evaluating next step to take in order to progress in the process and achieve a target objective.

BACKGROUND

Most of process, that may variate from industrial processes, quality checking process along an assembly line to training process having as goal education of a child or physical reeducation of a patient that underwent a surgery or a trauma, comprises a plurality of steps that may be done according to a predefined hierarchy. Indeed, for a given status of a process, certain steps may be done only if others prerequisite steps have been already done before.

In this context, it is useful to provide a solution allowing the user to access in an easily and fast way to the information concerning the current status of the process and at the same time the information concerning the possible next steps that may be taken in order to carry out the process and achieve a desired target.

SUMMARY

The present invention relates to a method for process analysis, where the process comprises at least one succession of steps associated to objectives to be achieved to reach the target objective, the method comprising the following steps:
  receiving a process map comprising:
    nodes and oriented links connecting two nodes, wherein the oriented links are associated to a predefined activation threshold and are configured to switch between an inactive configuration and an active configuration;
    at least one node being an initial node representing at least one basic prerequisite objective; and
    at least one node being a target node (representing at least one target objective;
  the nodes being connected by the oriented links so that the initial node and the target node are linked by at least one oriented path; wherein each node:
    represents an objective and is linked to at least one other node by at least one incoming oriented link and/or at least one outgoing oriented link;
    is configured to switch between non achievable objective state to a working-on objective state and to switch between the working-on objective state to an acquired state;
  receiving for all the nodes of the process map, a progression value of the node and the state of the node;
  updating the process map by:
    for each node in the working-on objective state, comparing its progression value to the predefined activation threshold of each outgoing oriented link of the node and whenever the predefined activation threshold of one oriented link exceed the progression value of the node switch the oriented link between the inactive configuration and active configuration;
    for each node in non-achievable objective state, switching to the working-on objective state whenever all incoming oriented links are in an active configuration.

This method advantageously allows to have all at once the information concerning the initial(s) objective(s), the target(s) objective(s) of the process and the oriented path(s) connecting the initial(s) objective(s) to the target(s) objective(s) as well as the actual state of progress thank to the visualization of the state of each node and the configuration each oriented link of the process map. Such graphic representation in the form of map assists the user in the task of rapidly and efficiently analyze the status of progress of the process and identify the objectives to work on in order to move along the oriented path through the target objective(s) so as to significantly reduce the working time to achieve the target objective and improve its quality.

According to one embodiment, the initial node also called source node, representing at least one prerequisite objective is in an acquired state.

According to one embodiment, each node is a visual landmark having dimensions proportional to the number of incoming and/or outgoing oriented links to which is linked. This advantageously allows the user to identify at a first view the more demanding objectives to achieve.

According to one embodiment, each oriented link is arrow-shaped and points toward the node for which it is an incoming oriented link.

According to one embodiment, each node includes a list of tasks to be accomplished to achieve the objective of the node.

According to one embodiment, the method further comprises at least one interactive means configured to select at least one node and display on the process map a window comprising the list of tasks and/or the progression value of the node.

According to one embodiment, the process is a training program for the acquisition of at least one target skill by a subject and the objective is a competence of the subject.

According to one embodiment, the progression values and the states of the nodes are calculated from received subject data.

According to one embodiment, the subject data comprises physiological signals acquired from a sensor and/or a user input.

According to one embodiment, the method further comprises a step pf displaying the updated process map The present invention also relates to a computer program comprising instructions which, when executed by a computer, cause the computer to carry out the steps of the display method according to any one of the embodiments hereabove.

The present invention also relates to computer readable medium comprising instructions which, when executed by a computer, cause the computer to carry out the steps of the method according to any one of the embodiments hereabove.

The present invention also relates to a system for process analysis, where the process comprises at least one succession of steps associated to objectives to be achieved to reach the target objective, the system comprising:
  a memory comprising a process map having:
    nodes and oriented links connecting two nodes, wherein the oriented links are associated to a predefined activation threshold and are configured to switch between an inactive configuration and an active configuration;

at least one node being an initial node representing at least one basic prerequisite objective; and at least one node being a target node representing at least one target objective;

the nodes being connected by the oriented links so that the initial node and the target node are linked by at least one oriented path; wherein each node:

represents an objective and is linked to at least one other node by at least one incoming oriented link and/or at least one outgoing oriented link;

is configured to switch between non achievable objective state to a working-on objective state and to switch between the working-on objective state to an acquired state;

a reception module configured to receive, for all the nodes of the process map, a progression value of the node and the state of the node;

a graphical representation module configured to generate an updated process map by:

for each node in the working-on objective state, comparing its progression value to the predefined activation threshold of each outgoing oriented link of the node and whenever the predefined activation threshold of one oriented link exceed the progression value of the node switch the oriented link between the inactive configuration and active configuration;

for each node in non-achievable objective state, switching to the working-on objective state whenever all incoming oriented links are in an active configuration;

a display module configured to display the updated a process map.

The present invention further relates to a method for obtaining a process map comprising nodes and oriented links connecting two nodes, said method comprises the following steps:

receiving a list of objectives comprising at least one target objective node representing at least one target objective;

receiving for each objective a topological ordering wherein the target objective had the higher ordering;

defining one node for each objective, wherein the target objective defines a target node and defining one node as an initial node representing at least one basic prerequisite objective;

obtaining a process map by, for each node, defining at least one incoming oriented link and/or at least one outgoing oriented link linking the node to at least one another node so that the initial node and the target node are linked by an oriented path;

wherein the oriented links are associated to a predefined activation threshold and are configured to switch between an inactive configuration and an active configuration; and the nodes are configured to switch between non achievable objective state to a working-on objective state and to switch between the working-on objective state to an acquired state.

Definitions

In the present invention, the following terms have the following meanings:

"Subject" refers to a mammal, preferably a human. In the sense of the present invention, a subject may be a patient, i.e. a person receiving medical attention, undergoing or having underwent a medical treatment, or monitored for the development of a disease.

BRIEF DESCRIPTION OF THE DRAWINGS

Features and advantages of the invention will become apparent from the following description of embodiments of a method and a system for electrocardiogram analysis according to the invention, this description being given merely by way of example and with reference to the appended drawings in which.

DETAILED DESCRIPTION

Figure 1:
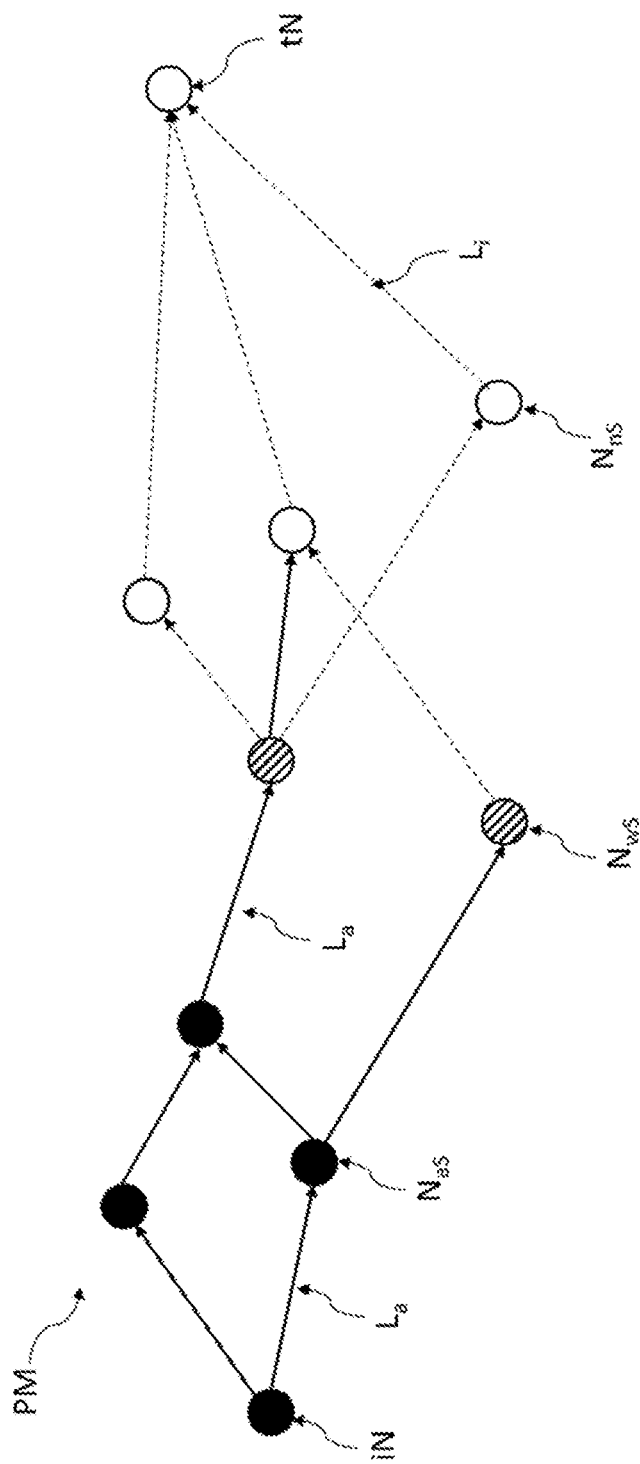
FIG. 1 is a first example of the state of the nodes and the configuration of the oriented link of a process map.

This invention relates to a computer-implemented method and a system for the analysis of the progress of a process. Said process comprises at least one succession of steps associated to objectives to be achieved to reach the target objective. In particular, the present invention relates to a computer-implemented method and a system for generation of a process map.

The process map is a graphic representation of the steps of the process in the form of a network of nodes and oriented links. The process map depends directly from the type of process, the steps that it comprises and the target objective.

According to one embodiment, the process map PM have been previously defined and stored in a memory or database.

According to one embodiment, the method comprises a preliminary step of receiving a process map, notably from a database.

According to one embodiment, the process map PM comprises at least one node being an initial node iN, representing at least one basic prerequisite objective of the process, and at least one node being a target node tN representing at least one target objective. The process map PM further comprises nodes representing the objectives of the process to be achieved to reach the target objective represented by the target node tN. The process map PM comprises oriented links, each connecting two nodes. More specifically each oriented link has a direction and points from one node to the next, therefore one oriented link is outcoming from one of the two node and incoming in the other node.

According to one embodiment, each node, the initial node iN and the target node tN included, is linked to at least one other node by at least one incoming oriented link and/or at least one outgoing oriented link.

The orientation of the link is a graphic representation of the hierarchic relation between the two nodes it connects. Indeed, the node for which the orient link is an outcoming link represents a prerequisite objective to be achieved so as to move forward to the objective represented by the node for which the oriented link is an incoming node. In other words, the oriented link points to the succeeding node in the process map.

The nodes are connected by the oriented links so that the initial node iN and the target node tN are linked by an oriented path. Said oriented path is a succession of oriented links, where each two consecutive oriented links in the succession are separated only by one node for which one orient link is an incoming orient link and the other one is an outgoing orient link.

The nodes and the oriented links as described above represent the basic structure of the process map. The graphical representation of the nodes and the oriented links provides to the user an overview of the process with all the objectives to be achieved in order to reach the target objective.

According to one embodiment, each node includes a list of tasks that have to be successful accomplished in order to achieve the objective of the node, wherein the list of tasks comprises at list one task.

Each node of the process map PM is configured to switch between non achievable objective state $N_{nS}$ to a working-on objective state $N_{wS}$ and to switch between the working-on objective state $N_{wS}$ to an acquired state $N_{aS}$. A node in an acquired state $N_{aS}$ shows that the objective that the node represents has been successfully achieved. A node in a working-on objective state $N_{wS}$ shows that the objective that the node represents may be achieved by performing a predefined list of tasks, since the prerequisite objective are already been successfully achieved. A node in a non achievable objective state $N_{nS}$ shows that the objective that the node represents can not be achieved due to the lack of necessary prerequisite objective.

Each oriented link is associated to a predefined activation threshold and are configured to switch between an inactive configuration $L_i$ and an active configuration $L_a$. According to one embodiment, the value of the activation threshold is different from oriented link to oriented link. For example, for two oriented links outgoing from one node, the first oriented link may have a value of the activation threshold higher than the second oriented link. This embodiment allows an asynchronous progression through the process map, and therefore a progression that may be faster along one oriented path that comprises oriented links having lower activation thresholds.

The method is configured to receive, for all the nodes of the process map, a progression value of the node and the state of the node. According to one embodiment, the progression value is a parameter representing the percentage of tasks that have been successful achieved in the list of tasks of the node. In other word it represents the degree of progression towards the achievement of the objective of the node.

According to one exemplary embodiment, the progression value is a score normalized to 1 which is equal to zero for all the nodes in a non achievable objective state $N_{nS}$, equal to 1 for all nodes in an acquired state $N_{aS}$ and is comprised between zero and 1 for all the nodes in a working-on objective state $N_{wS}$.

According to one embodiment, the process map PM is a directed acyclic graph which is a finite directed graph with no directed cycles. Indeed, the process map PM, it consists of finitely many nodes and oriented links (also called edges), with each oriented link directed from one node to another, such that there is no way to start at any node v and follow a consistently-directed sequence of oriented links that eventually loops back to the node v again. Equivalently, a directed acyclic graph has a topological ordering, a sequence of the nodes such that every oriented is directed from earlier to later in the sequence. Furthermore, the process map PM is a connected graph, meaning that all the nodes are at least one incoming or/and outcoming oriented link.

In order to visualize the actual status of progression of the process, the states of the nodes and the configurations of the oriented links of the process maps are updated using as information the progression value and the state of each node.

More in details, for each node in the working-on objective state $N_{wS}$, its progression value is compared to the predefined activation threshold of each outgoing oriented link of the node and whenever the predefined activation threshold of one oriented link exceed the progression value of the node switch the oriented link from the inactive configuration $L_i$ and active configuration $L_a$.

In addition, for each node in non-achievable objective state $N_{nS}$, the method is configured to switch the node from non-achievable objective state $N_{nS}$ to the working-on objective state $N_{wS}$ whenever all incoming oriented links are in an active configuration $L_a$.

According to one embodiment, the initial node iN representing at least one prerequisite objective is in an acquired state $N_{aS}$.

According to one alternative embodiment, the initial node is a working-on objective state $N_{wS}$ representing the first objective to achieve associated. In this embodiment, the initial nodes comprise the list of the first task to be done.

Figure 2:
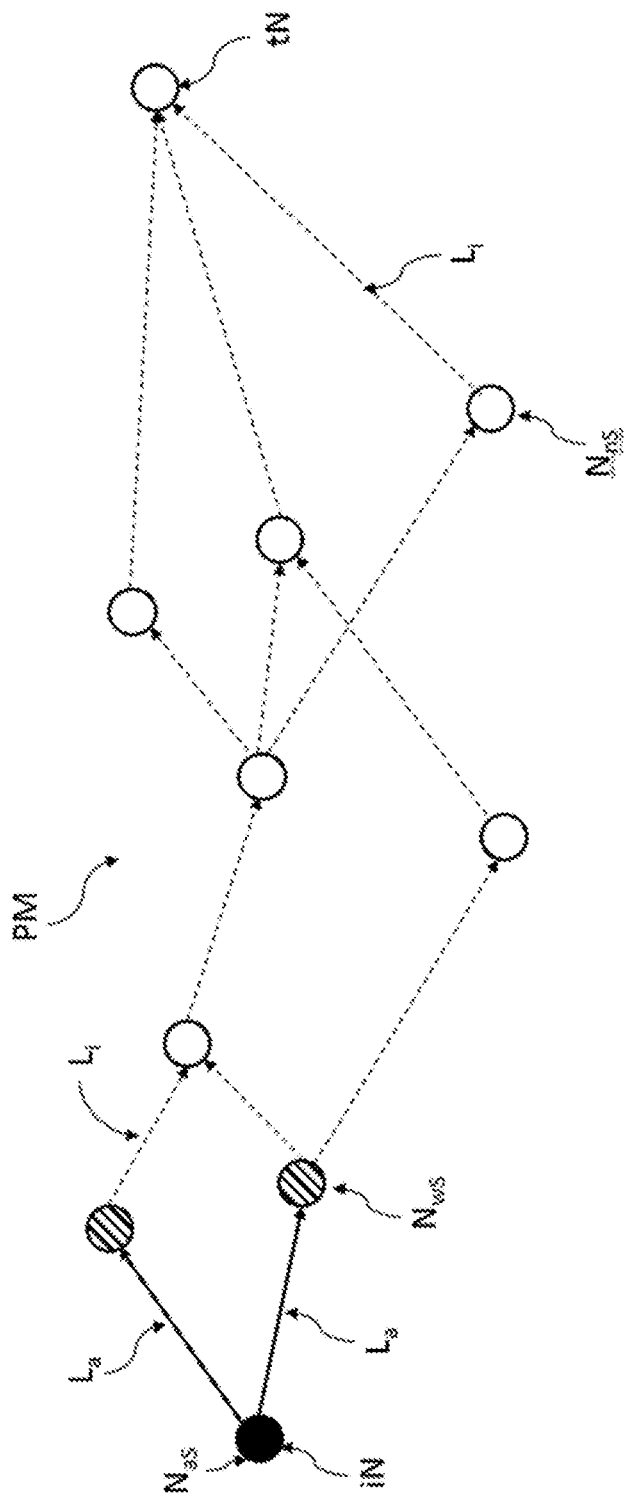
FIG. 2 is a second example of the state of the nodes and the configuration of the oriented link of a process map.

According to one embodiment illustrated in FIG. 2, in a process map not yet updated with progression value and the state of the nodes representing the current status of the process, only the initial node iN representing at least one prerequisite objective is in an acquired state $N_{aS}$ and the only oriented link(s) in an active configuration $L_a$ is/are the oriented link(s) outcoming from the initial node iN. In this embodiment, the node(s) toward which are pointing the oriented link(s) originating from the initial node iN is/are in a working-on objective state $N_{wS}$.

The visualization of the updated process map allows the user to have a schematic graphical representation of the current status of progression of the process.

According to one embodiment, the method further comprises a step of displaying the updated process map.

Figure 3:
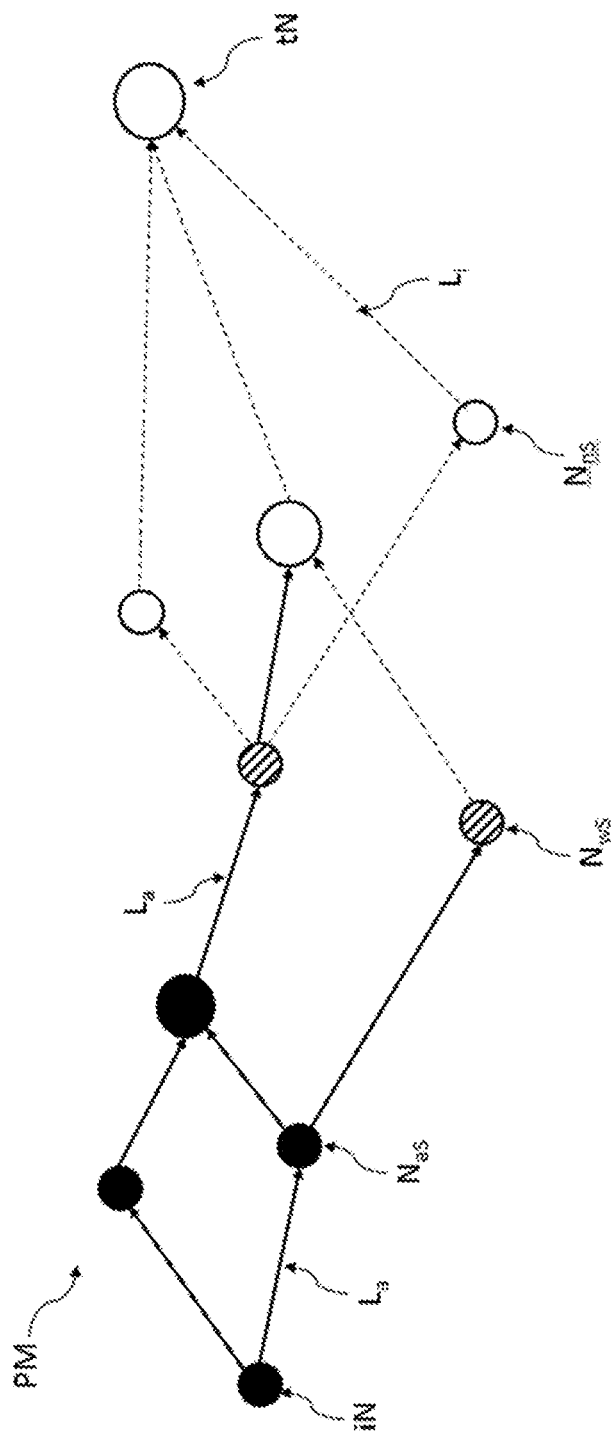
FIG. 3 is a third example of the state of the nodes and the configuration of the oriented link of a process map.

According to the embodiments illustrated in FIGS. 1 to 3, each oriented link is arrow-shaped and points toward the node for which it is an incoming oriented link. The oriented links in an active configuration $L_a$ may be represented by solid segments arrow-shaped while the oriented links in the inactive configuration $L_i$ may be represented by dashed segments arrow-shaped.

According to the embodiments illustrated in FIGS. 1 to 3, each node is a visual landmark and the state of each node is graphically represented by a color or a pattern. For example, all the visual landmarks representing the nodes in an acquired state $N_{aS}$ are filled in black, the visual landmarks representing the nodes in a non achievable objective state $N_{nS}$ are filled in white and the visual landmarks representing the nodes in a working-on objective state $N_{wS}$ are filled with a pattern of parallel black lines.

According to one embodiment illustrated in FIG. 3, the visual landmark representing the nodes have dimensions proportional to the number of incoming oriented links to which is linked. In one example, the landmark is a round-shaped landmark whose diameter is proportional to the number of incoming oriented links to which is linked.

According to one embodiment, the method further comprises at least one first interactive means configured to select at least one node and display on the process map PM at least one window comprising the list of tasks and/or the progression value of the node.

According to one embodiment, the method further comprises the second interactive means configured to produce a zoom in and out on the process map PM.

According to one embodiment, the process is a training program for the acquisition of at least one target skill by a subject and the objective is a competence of the subject.

The method of the present invention may be implemented for generating a training map and displaying a training program (i.e. process) for the development of at least one target skill (i.e. target objective).

According to one embodiment the method for analysis of a training program, where the training program comprises at least one succession of steps associated to objectives to be achieved to obtain a target skill, the display method comprising the following steps:
  receiving a training map comprising:
    nodes and oriented links connecting two nodes, wherein the oriented links are associated to a predefined activation threshold and are configured to switch between an inactive configuration and an active configuration,
    at least one node being an initial node representing at least one basic prerequisite competence and
    at least one node being a target node representing at least one target skill;
  the nodes being connected by the oriented links so that the initial node and the target node are linked by an oriented path; wherein each node:
    represents a competence and is linked to at least one other node by at least one incoming oriented link and/or at least one outgoing oriented link;
    is configured to switch between non achievable competence state to a working-on competence state and to switch between the working-on competence state to an acquired state;
  receiving for all the nodes of the training map, a learning value of the node and the state of the node;
  for each node in the working-on competence state, comparing its learning value to the predefined activation threshold of each outgoing oriented link of the node and whenever the predefined activation threshold of one oriented link exceed the learning value of the node switch the oriented link between the inactive configuration and active configuration;
  for each node in non-achievable competence state, switching to the working-on competence state whenever all incoming oriented links are in an active configuration;
  displaying the state of each node and the configuration each oriented link of the training maps.

According to one embodiment, the progression values and the states of the nodes are calculated from subject data. In this embodiment, the method further comprises a step of receiving subject data comprising information concerning which tasks of the list of tasks of a node have been successfully achieved by the subject. The progression values may therefore be calculated as percentage of tasks that have been successful achieved in the list of tasks of the node and from the progression values the state of the node by be easy obtained. The subject data may further comprise the identity of the subject which may allow to recall from a database all subject data concerning him/her.

According to one embodiment, the subject data comprises physiological signals acquired from a sensor and/or a user input. In this embodiment, the information concerning whether or not a task has been successfully achieved by the subject may be directly provided as input to the method by the user or it may be calculated from the physiological signals.

According to one embodiment, the training program is neurodevelopment program. In this embodiment, the user of the method of the present invention may be a family carer (ex. parent), a specialized educator/educator monitor, a psychologist, a nurse, health executive/team leader, speech therapist, psychometrician, occupational therapist, a specialized teacher and/or other professions of intervention or supervision of the medico-social, social, para-medical, medical sector. In this embodiment, the subject who's undergoing the training program may be a patient that the user has in charge, such as (ordinary) neurotypic children; children with neurodevelopmental disorders: intellectual disability, autism, dys disorders, etc. or children hosted in health centers or educational centers.

According to one example, the method is used for neurodevelopment. In this example, the user connects to the mobile application that may be executed by a smartphone, tablet or a web browser, via a unique identifier (an email address or a code) and a password. The mobile application accesses the internet or an encrypted token stored on the device to recognize the credentials and allow access. During the first use, the user creates a "subject profile" card in the application in which he/she provides the name, surname, sex and age of the subject whose skills development is targeted, for example a child having neurodevelopmental disorders. Then the user completes an exhaustive questionnaire on the subject's competences (i.e. objectives). Each competence, such as "Use thumb-index finger (fine motor)", is evaluated with one of the following labels: "not acquired", "emergent", "acquired" or "unassessed". Once the questionnaire has been completed, this information is used to estimate the state and the progression value of the nodes of a training map that has been received from a remote server. The training map is than updated with the current data so as to represent the current status of progression of the subject in his/her training program. The display screen of the mobile application displays a complete visualization of the state of the nodes and the configuration of the oriented link of the updated training map so as to visualize the subject's competences that have been acquired, under development or still not achievable. Each node corresponds to one of the 680 competences referenced in the application database. In this example, one of the nodes is associated with "manipulating clay" and is connected to the node "using the thumb-index finger" by an oriented link is an active configuration $L_a$. Concretely, this means that the nodes "using the thumb-index finger" is in a working-on objective state $N_{wS}$ and the use of the thumb-index finger is accessible to subject who know how to manipulate clay. Each competence is associated with a descriptive sheet that contains the main characteristics of the competence, a proposal of list of tasks (i.e. exercise) to develop this competence, reinforce it, as well as the procedures of intervention recommended for the user. The user can modify the progression value of each competence by modifying the labels evaluating the competence. Automatically, the visualization of the updated training map is loaded to display the new non achievable objective states $N_{nS}$, working-on objective states $N_{wS}$ and acquired state $N_{aS}$, in order to constantly show to the user the subject's development path to follow. In this example, the purpose of the graphic representation is to visually represent the state of a patient's motor, social, and cognitive development. This helps the multidisciplinary teams of special education, teaching, paramedical or medical to coordinate in order to offer the patient a consistent and relevant support to his needs.

According to one embodiment, the training program is a reeducation program where the user of the method may be a doctor (all specialties), a nurse, occupational therapist, a family caregiver, the patient himself (the subject), or other professions in the health services (follow-up care and rehabilitation, post-operative, rehabilitation and re-education institutes, etc.).

According to a second example, the method is used for reeducation. In this example, the user connects to the mobile application that may be executed by a smartphone, tablet or a web browser, via a unique identifier (an email address or a code) and a password. The mobile application accesses the internet or an encrypted token stored on the device to recognize the credentials and allow access. During the first use, the user creates a "user profile" card in the application in which he/she provides his/her name, surname, sex and age and the target objective competence to achieve. In this example the subject is an adult that have broken his leg and his target objective is to completely recover from the injury. Then the user completes an exhaustive questionnaire on his physical competences (i.e. objectives). Each competence, such as for example "flex the leg more than 90 degrees", is evaluated with one of the following labels: "not acquired", "emergent", "acquired" or "unassessed". Once the questionnaire has been completed, this information is used to estimate the state and the progression value of the nodes of a training map that has been received from a remote server. The training map is than updated with the current data so as to represent the current status of progression of the user in his/her reeducation training program. The display screen of the mobile application displays a complete visualization of the state of the nodes and the configuration of the oriented link of the updated training map so as to visualize the user's current competences that have been acquired, that are still under development or that are yet not achievable. In this example, one node is associated with "flex the leg more than 90 degrees" and is connected to the node "sit cross-legged" by an oriented link is an active configuration $L_a$. Concretely, this means that the nodes "sit cross-legged" is in a working-on objective state $N_{wS}$ and the ability to sit cross-legged is accessible to subject who are able to flex the legs more than 90 degrees. Each competence is associated with a descriptive sheet that contains the main characterics of the competence, a proposal of list of tasks (i.e. physical exercise) to develop this competence and reinforce it. The user can modify the progression value of each competence (i.e. node) by modifying the labels using to evaluate the status of progression of the achievement of the competence. Automatically, the visualization of the updated training map is loaded to display the new non achievable objective states $N_{nS}$, working-on objective states $N_{wS}$ and acquired state $N_{aS}$, in order to constantly show to the user the development path to follow. In this example the application allows the user to visualize his rehabilitation path and to understand how the oriented path (the direction in which the exercises will be made) is constructed. The goal in this example is to obtain a better user's adherence to his/her rehabilitation path, and to provide him/her with a fast-visual support to read to offer each user (in a center for example) a personalized service.

In others examples the process map may be used to represent skill development such as improvement of cognitive skills (mental math, fast reading, memorization), training for reaction in emergency cases (industrial plant management, emergency hospitals) or acquisition of complex procedures (fabrication protocols).

The present invention also relates to a computer-readable storage medium comprising instructions which, when the program is executed by a computer, cause the computer to carry out the steps of the computer-implemented method as described above. According to one embodiment, the computer-readable storage medium is a non-transitory computer-readable storage medium.

Computer programs implementing the method of the present invention can commonly be distributed to users on a distribution computer-readable storage medium such as, but not limited to, an SD card, an external storage device, a microchip, a flash memory device and a portable hard drive. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

The instructions or software to control a processor or computer to implement the hardware components and perform the method as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

The present invention also relates to a system comprising means for carrying out the steps of the method as described above.

More in details the present invention relates to a system for process analysis, where the process comprises at least one succession of steps associated to objectives to be achieved to reach the target objective, the system comprising:

a memory comprising a process map PM having:
        nodes and oriented links connecting two nodes, wherein the oriented links are associated to a predefined activation threshold and are configured to switch between an inactive configuration $L_i$ and an active configuration $L_a$;
        at least one node being an initial node iN representing at least one basic prerequisite objective; and
        at least one node being a target node tN representing at least one target objective;

the nodes being connected by the oriented links so that the initial node iN and the target node tN are linked by at least one oriented path; wherein each node:

represents an objective and is linked to at least one other node by at least one incoming oriented link and/or at least one outgoing oriented link;

is configured to switch between non achievable objective state $N_{nS}$ to a working-on objective state $N_{wS}$ and to switch between the working-on objective state $N_{wS}$ to an acquired state $N_{aS}$;

a reception module configured to receive, for all the nodes of the process map, a progression value of the node and the state of the node;

a graphical representation module configured to generate an updated process map PM by:

for each node in the working-on objective state $N_{wS}$, comparing its progression value to the predefined activation threshold of each outgoing oriented link of the node and whenever the predefined activation threshold of one oriented link exceed the progression value of the node switch the oriented link between the inactive configuration $L_i$ and active configuration $L_a$;

for each node in non-achievable objective state $N_{nS}$, switching to the working-on objective state $N_{wS}$ whenever all incoming oriented links are in an active configuration $L_a$.

a display module configured to display the updated a process map PM.

In one embodiment, the system comprises dedicated circuitry or a general-purpose computer, configured for receiving the data and executing the steps of the method of steps of a process for at least one target objective achievement as described above. In one embodiment, the system comprises a processor and the computer program of the present invention.

In one embodiment, the system of the present invention comprises a communication module to transmit the updated process map to the display module for visualization. The display module may alternatively be a screen to display the process map or a user interface comprising the process map.

According to one embodiment, the system comprises an electronic module configured to perform a mobile application configured to interact with the user in order to receive inputs from the user and to produce an updated process map. According to this embodiment, a display screen is connected to the electronic module and arranged to display information relating to the mobile application. The electronic module must be capable of executing one or more mobile applications. By mobile application, is understood as any computer software containing a series of instructions performed in order to fill the given functionality.

The present invention further relates to a method for obtaining a process map PM comprising nodes and oriented links connecting two nodes.

The method for obtaining a process map PM comprises a first step consisting in receiving a list of objectives comprising at least of one target objective node representing at least one target objective and receiving for each objective a topological ordering wherein the target objective had the higher ordering.

The method for obtaining a process map PM is further configured to defining one node for each objective, wherein the target objective defined a target node. The method also defines one node as an initial node representing at least one basic prerequisite objective.

The following step consists in obtaining a process map by, for each node, defining at least one incoming oriented link and/or at least one outgoing oriented link linking the node to at least one another node so that the initial node and the target node are linked by an oriented path; wherein the oriented links are associated to a predefined activation threshold and are configured to switch between an inactive configuration $L_i$ and an active configuration $L_a$; and the nodes are configured to switch between non achievable objective state $N_{nS}$ to a working-on objective state $N_{wS}$ and to switch between the working-on objective state $N_{wS}$ to an acquired state $N_{aS}$.

According to one embodiment, the process map PM is constructed to be a directed acyclic graph which is a finite directed graph with no directed cycles. Indeed, the process map PM as obtained in the present invention consists of finitely many nodes and oriented links (also called edges), with each oriented link directed from one node to another, such that there is no way to start at any node v and follow a consistently-directed sequence of oriented links that eventually loops back to the node v again. Equivalently, a directed acyclic graph has a topological ordering, a sequence of the nodes such that every oriented is directed from earlier to later in the sequence. Furthermore, the process map PM is a connected graph, meaning that all the nodes are at least one incoming or/and outcoming oriented link.

While various embodiments have been described and illustrated, the detailed description is not to be construed as being limited hereto. Various modifications can be made to the embodiments by those skilled in the art without departing from the true spirit and scope of the disclosure as defined by the claims.

Illustrative Embodiments of the Invention

Figure 4:
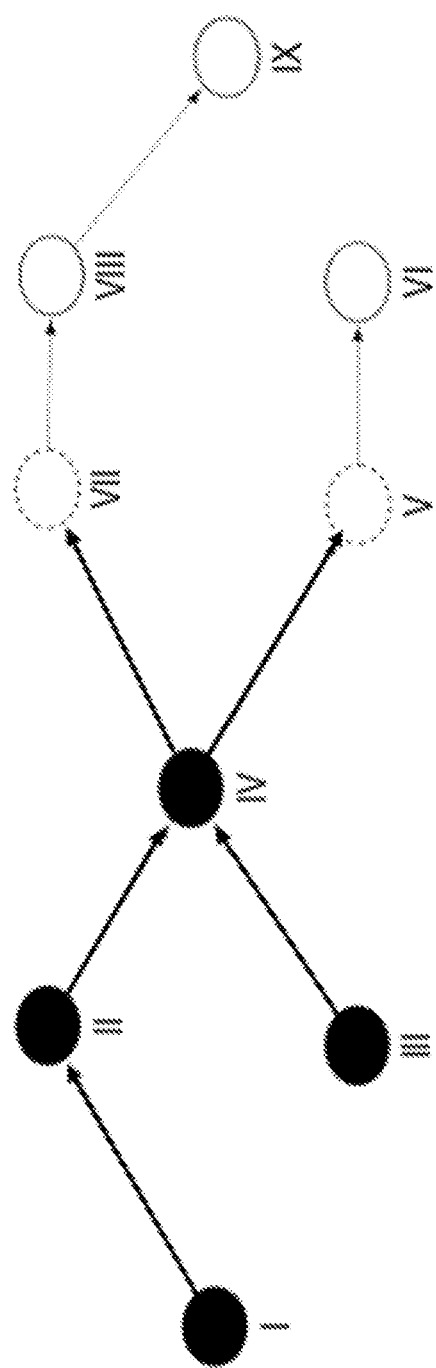
FIG. 4 show a fourth example of the state of the nodes and the configuration of the oriented link of a process map.

In the example shown in FIG. 4, the process map comprises nine nodes connected by eight oriented links. The process map PM is configured to allow a subject, notably a kid, to achieve the goal of being able to name fluidly word in one language and name specific parts of a scene. Two target nodes are therefore present in this process map: the node IX which relates to the objective of "naming words fluidly" and the node VI which relates to the objective of "naming specific parts of a scene". This example further comprises two initial nodes. The first initial node iN, which is labeled in the Figure as I, relates to the objective "name the reinforcers" and is an acquired state $N_{aS}$, visualized as a black full circle. The initial node I is connecter by an oriented link in an active configuration $L_a$, visualized as a bold arrow, to the node II which relates to the objective "name familiar objects". Since the objective of the node II is an acquired state $N_{aS}$, visualized as a black full circle, this provides the information to a user displaying the process map PM that this objective has already been achieved by the subject. The second initial node III, relates to the objective "naming by yes/no" and is as well in an acquired state $N_{aS}$. The node IV, representing the objective "name a designated object", receives two incoming oriented links, coming from the node II and the second initial node III, which are both in an active configuration $L_a$. Since both these oriented links are in an active configuration $L_a$, the node IV is as well in an acquired state $N_{aS}$. Two oriented links in an active configuration $L_a$ leave the node IV to reach node V, representing the objective "naming items in a scene", and node VII, representing the objective "name the object according to one of its aspects". Both nodes V et VII are in a working-on objective state $N_{wS}$ which is represented by a dashed circle. This provides the information to the user that, since the objectives of nodes I to IV have already been achieved by the subject, he/she can propose to the subject to work on both the objectives of nodes V and VII, or first to the objective of node V and after to the objective of node VII or inversely. Node V points through an oriented link in an inactive state $L_i$ to node VI which is still in a non achievable objective state $N_{nS}$. While the node VII is connected to the target node IX by two oriented links in an inactive state $L_i$ and the intermediate node VIII, which represents the objective "acquire new denominations", is in a non achievable objective state $N_{nS}$. This visualization of the progress map clearly shows to the user that he/she still cannot propose to the subject to work on the achievement of objectives of nodes VI, VIII and IX.

Figure 5:
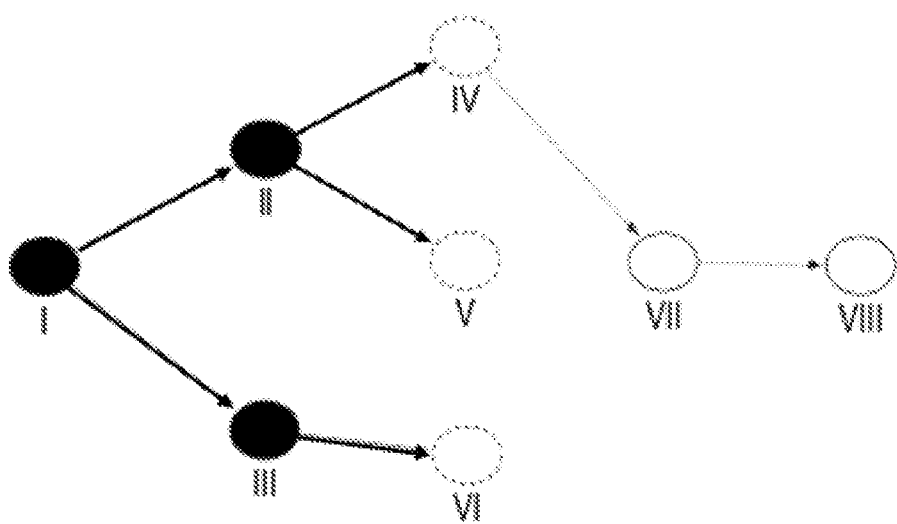
FIG. 5 show a fifth example of the state of the nodes and the configuration of the oriented link of a process map.

The example of FIG. 5 concerns a neurodevelopment process of a subject, notably a child. The process map comprises one initial node I, representing the objective "name a designated object", which is connected through multiple oriented paths to three target nodes V, VI and VIII, representing respectively the target objectives of "name the function of an object", "name multiple components" and "make a sentence with a preposition". This process map shows to the user that the objectives of node I, node II (objective of "name an item by its function") and node III (objective of "naming and action") are in an acquired state $N_{aS}$, represented by full black circles. It also shows, thanks to the active configuration $L_a$ of the oriented link (i.e. bold arrows) pointing from node II to node VI and to the working-on objective state $N_{wS}$ of node VI (i.e. dashed circle), that the target objective of node VI may be achievable for the subject, given the current status of progress of the neurodevelopment process. In the same way, the process map shows as well that the user may propose to the subject to work on the objective of nodes IV ("name with "noun-verb") and target node V since those two nodes are in a working-on objective state $N_{wS}$. Node IV is connected to node VII, representing the objective of "name an item with a sentence", by one oriented link in an inactive configuration $L_i$. Node VII is represented as a white circle meaning that the node is in a non achievable objective state $N_{nS}$. The process map therefore shows to the user that in order to achieve the target objective of node VIII the subject has to follow the oriented path connecting node IV to node VIII by achieving first the objective of node IV and then the objective of node VII in order to be able to work on the objective of node VIII.

Figure 6:
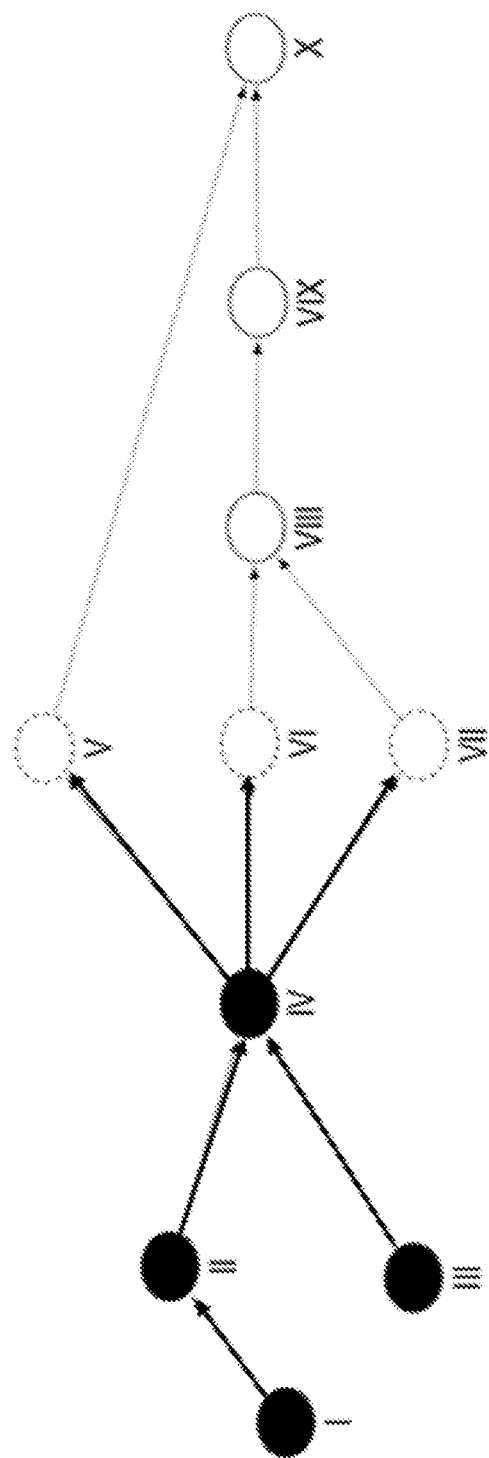
FIG. 6 show a sixth example of the state of the nodes and the configuration of the oriented link of a process map.

The example illustrated in FIG. 6, concerns a process of learning of a language for a child or a new language for an adult. In this example, the process map PM is configured to allow a subject to achieve the goal of using adverbs, graphically represented by the target node X. This example comprises two initial nodes. The first initial node iN, which is labeled in the FIG. 6 as I, relates to the objective "name the reinforcers" and in an acquired state $N_{aS}$, visualized as a black full circle. The initial node I is connecter by an oriented link in an active configuration $L_a$, visualized as a bold arrow, to the node II which relates to the objective "name familiar objects". Since the objective of the node II is an acquired state $N_{aS}$, visualized as a black full circle, this provides the information to a user visualizing the process map PM that this objective has already been achieved by the subject. The second initial node III, relates to the objective "naming by yes/no" and is as well in an acquired state $N_{aS}$. Node IV, representing the objective "name a designated object", receives two incoming oriented links, coming from the node II and the second initial node III, which are both in an active configuration $L_a$. Since both these oriented links are in an active configuration $L_a$ the node IV is as well in an acquired state $N_{aS}$. Three oriented links in an active configuration $L_a$ leave the node IV to reach node V, node VI and node VII, representing respectively the objectives of "name pronouns", "name the color of an object" and "name the shape of objects". Nodes V, VI and VII are in a working-on objective state $N_{wS}$ represented as dashed circles, informing the user that he/she can propose the subject to work on one of this three objectives no matter the order. In the case wherein the subject is an adult learning a new language, he/she can be as well the user. One oriented link in an inactive configuration $L_i$ leaves each of the node V, VI and VII. Both oriented links leaving nodes VI and VII reach node VII while the oriented link leaving node V reaches directly the target node X. This provides the information to the user that in order to achieve the target objective, the user/subject has to follow the oriented path passing by node VIII, representing the objective of "name object features", and then node VIX, representing the objective of "name prepositions", so as to finally have access to target node X.

The invention claimed is:

1. A computer-implemented method for a training program directed to a subject receiving medical attention, where the training program comprises at least one succession of steps associated to objectives to be achieved by the subject to reach a target objective, the method comprising:
receiving a process map comprising:
nodes and oriented links connecting two nodes, wherein each oriented link is associated to a predefined activation threshold; wherein each oriented link is configured to switch between an inactive configuration and an active configuration, and wherein said predefined activation threshold is a value on which an inactive configuration or active configuration is based;
at least one node being an initial node representing at least one basic prerequisite objective; wherein said initial node is an acquired state associated to the one basic prerequisite objective already acquired by the subject; and
at least one node being a target node representing at least one target objective directed to an improved medical state;
the nodes being connected by the oriented links so that the initial node and the target node are linked by at least one oriented path; wherein each of said nodes following the initial node:
represents an objective and is linked to at least one other node by at least one incoming oriented link and/or at least one outgoing oriented link;
is configured to switch between a non-achievable objective state, which shows that the subject has not acquired a prerequisite objective that is required to achieve the objective, to an authorized objective state, which shows that the subject has achieved the prerequisite objective and that the subject may achieve the objective by performing a predefined list of tasks because the subject has achieved the prerequisite objective, and to switch between the authorized objective state to an acquired state, which shows the subject has performed the predefined list of tasks and achieved the objective, is configured to restrict user access to said node when in the non-achievable objective state, and is configured to automatically update a display after each instance of switching;

receiving, for each of the nodes of the process map, a progression value of each node, which is associated to a percentage of achieved tasks from the predefined list of tasks, and the state of each node;

updating the process map by:
for each node in the authorized objective state, comparing its progression value to the value of the predefined activation threshold of each outgoing oriented link of the node and whenever the value of the predefined activation threshold of one oriented link exceed the progression value of the node, switching the oriented link from the inactive configuration to the active configuration;

for each node in non-achievable objective state, switching to the authorized objective state whenever all incoming oriented links are in an active configuration and switching to the acquired state when the objective that the node represents has been achieved by the subject;

outputting the updated process map so that the subject performs the training program based on said updated process map; and iteratively updating the process map during the progression of the training program.

2. The method according to claim 1, wherein the initial node representing at least one prerequisite objective is in an acquired state.

3. The computer-implemented method according to claim 1, wherein each node is a visual landmark having dimensions proportional to a number of incoming oriented links to which said node is linked.

4. The computer-implemented method according to claim 1, wherein each oriented link is arrow-shaped and points toward the node for which it is an incoming oriented link.

5. The computer-implemented method according to claim 1, wherein each node includes information associated to the list of tasks to be accomplished to achieve the objective of the node.

6. The computer-implemented method according to claim 1, wherein the method further comprises interactively selecting at least one node and displaying on the process map a window comprising the list of tasks and/or the progression value of the node.

7. The computer-implemented method according to claim 1, wherein the training program includes the acquisition of at least one target skill by the subject and the objective associated to at least one of said nodes is a competence of the subject.

8. The computer-implemented method according to claim 1, wherein the progression values and the states of the nodes are calculated from subject data.

9. The computer-implemented method according to claim 8, wherein the subject data comprises physiological signals acquired from a sensor and/or a user input.

10. The computer-implemented method according to claim 1, comprising displaying the updated process map.

11. The computer-implemented method according to claim 1, wherein the training program is a reeducation program for a subject with physical impairment.

12. The computer-implemented method according to claim 1, wherein the training program is a neurodevelopment process of a child with neurodevelopmental disorders.

13. A system for a training program directed to a subject receiving medical attention, wherein the training program comprises at least one succession of steps associated to objectives to be achieved by the subject to reach a target objective, the system comprising:

at least one memory comprising a process map having:
nodes and oriented links connecting two nodes, wherein each oriented link is associated to a predefined activation threshold, wherein each oriented link is configured to switch between an inactive configuration and an active configuration, and wherein said predefined activation threshold is a value on which an inactive configuration or active configuration is based;

at least one node being an initial node representing at least one basic prerequisite objective; wherein said initial node is an acquired state associated to the one basic prerequisite objective already acquired by the subject; and at least one node being a target node representing at least one target objective directed to an improved medical state;

the nodes being connected by the oriented links so that the initial node and the target node are linked by at least one oriented path; wherein each of said nodes following the initial node:
represents an objective and is linked to at least one other node by at least one incoming oriented link and/or at least one outgoing oriented link;

is configured to switch between a non-achievable objective state, which shows that the subject has not acquired a prerequisite objective that is required to achieve the objective, to an authorized objective state, which shows that the subject has achieved the prerequisite objective and that the subject may achieve the objective by performing a predefined list of tasks because the subject has achieved the prerequisite objective, and to switch between the authorized objective state to an acquired state, which shows the subject has performed the predefined list of tasks and achieved the objective, is configured to restrict user access to said node when in the non-achievable objective state, and is configured to automatically update a display after each instance of switching;

at least one input adapted to receive, for each of the nodes of the process map, a progression value of each node and the state of each node;

at least one processor configured to generate an updated process map by:
for each node in the authorized objective state, comparing the progression value to the value of the predefined activation threshold of each outgoing oriented link of the node and, whenever the value of the predefined activation threshold of one oriented link exceeds the progression value of the node, switching the oriented link from the inactive configuration and to the active configuration;

for each node in non-achievable objective state, switching to the authorized objective state whenever all incoming oriented links are in an active configuration and switching to the acquired state when the objective that the node represents has been achieved by the subject;

wherein the at least one processor is configured to iteratively update the process map during the progression of the training program; and at least one output adapted to provide said updated process map so that the subject performs the training program based on said updated process map.

14. The system according to claim 13, wherein each node includes information associated to the list of tasks to be accomplished to achieve the objective of the node.

15. The system according to claim 13, wherein the progression values and the states of the nodes are calculated from subject data and the subject data comprises physiological signals acquired from a sensor and/or a user input.

16. The system according to claim 13, wherein the training program is a reeducation program for a subject with physical impairment.

17. The system according to claim 13, wherein the training program is a neurodevelopment process of a child with neurodevelopmental disorders.

18. A non-transitory computer readable medium comprising instructions which, when executed by a computer, cause the computer to carry out the steps of the method according to claim 1.

19. A method for obtaining a process map for a training program for a subject receiving medical attention, comprising nodes and oriented links connecting two nodes, said method comprising:
- receiving a list of objectives comprising at least one target objective node representing at least one target objective directed to an improved medical state;
- receiving for each objective a topological ordering wherein the target objective had the higher ordering;
- defining one node for each objective, wherein the target objective defines a target node, and defining one node as an initial node representing at least one basic prerequisite objective;
- obtaining a process map by, for each node, defining at least one incoming oriented link and/or at least one outgoing oriented link linking the node to at least one another node so that the initial node and the target node are linked by an oriented path;
- outputting said process map so that the subject performs the training program based on said process map;
- wherein each oriented link is associated to a predefined activation threshold and is configured to switch between an inactive configuration and an active configuration based on a comparison with a progression value associated with the node for which the oriented links is an outgoing link;
- wherein said initial node is an acquired state associated to the one basic prerequisite objective already acquired by the subject; and
- wherein the each node following the initial node is configured to switch between a non-achievable objective state to an authorized objective state, which shows that the subject has not acquired a prerequisite objective that is required to achieve the objective by performing a predefined list of tasks because the subject has achieved the prerequisite objective, whenever all incoming oriented links are in an active configuration and to switch between an authorized objective state to an acquired state, which shows the subject has performed the predefined list of tasks and achieved the objective, when the objective that the node represents has been achieved, is configured to restrict user access to said node when in the non-achievable objective state, and is configured to automatically update a display after each instance of switching.

* * * * *